United States Patent
Gallo

(10) Patent No.: US 8,072,345 B2
(45) Date of Patent: Dec. 6, 2011

(54) ELECTRONIC FLARE SYSTEM AND APPARATUS

(76) Inventor: Darren Gallo, Calabasas, CA (US)

(*) Notice: Subject to any disclaimer, the term of this patent is extended or adjusted under 35 U.S.C. 154(b) by 314 days.

(21) Appl. No.: 12/070,007

(22) Filed: Feb. 14, 2008

(65) Prior Publication Data

US 2009/0207038 A1 Aug. 20, 2009

(51) Int. Cl.
*G08B 5/22* (2006.01)
*G09F 9/33* (2006.01)

(52) U.S. Cl. .................................. 340/815.45; 340/472

(58) Field of Classification Search ............. 340/815.45, 340/471, 472, 473
See application file for complete search history.

(56) References Cited

U.S. PATENT DOCUMENTS

| | | | | |
|---|---|---|---|---|
| 4,825,192 A * | 4/1989 | Wells | ............................. | 340/472 |
| 4,835,515 A * | 5/1989 | McDermott et al. | .......... | 340/472 |
| 4,870,543 A * | 9/1989 | Born et al. | ..................... | 340/471 |
| 5,574,428 A * | 11/1996 | Groover | ........................ | 340/471 |
| 5,786,758 A * | 7/1998 | Bullock | ........................ | 340/471 |
| 6,100,800 A * | 8/2000 | Sigari | ............................ | 340/473 |
| 6,246,314 B1 * | 6/2001 | Djaid | ............................ | 340/471 |
| 6,268,793 B1 * | 7/2001 | Rossi | ............................ | 340/471 |
| 6,337,623 B1 * | 1/2002 | Krugh et al. | .................. | 340/472 |
| 6,461,008 B1 * | 10/2002 | Pederson | ..................... | 340/472 |

\* cited by examiner

*Primary Examiner* — John A Tweel, Jr.

(57) ABSTRACT

A device includes an electronic flare having many light emitting diodes (LEDs), an arm connected to the electronic flare, a controller connected to the electronic flare, and a housing connected to the arm. A system includes a first electronic flare device that is disposed in a first portion of a vehicle, a second electronic flare device is disposed in a second portion of the vehicle, a first sensor is connected to the first electronic flare device and a second sensor is connected to the second electronic flare device. The first and second flare devices each have a flare housing including a plurality of light emitting diodes (LEDs). The first electronic flare device operates to deploy when the first sensor detects a first event, and the second electronic flare device operates to deploy when the second sensor detects a second event.

20 Claims, 10 Drawing Sheets

DETAILED DESCRIPTION# ELECTRONIC FLARE SYSTEM AND APPARATUS

BACKGROUND

1. Field

The embodiments relate to safety products, and in particular to an electronic flare system and apparatus.

2. Description of the Related Art

Ignited flares have been used for a long time to warn other drivers of obstacles or to be cautious in approaching. To employ these type of flares, a person must exit their vehicle ignite the flare and then place the flare ahead of their vehicle to warn other drivers. When people do this, they are placing themselves at risk with other motorists. Also, if the driver is in an accident or becomes sick, they cannot exit their vehicle to employ such a flare.

When motorists are involved in accidents where there may be no lighting equipment or in case the motorist's vehicle has left a roadway, it can sometimes take a very long time for this motorist to be found, or even be seen on the road. Even if the vehicle's lights are turned on, the vehicle can be positioned where the lights cannot be seen. Also, the lights on the vehicle may not be operable due to a disconnection of the vehicle's battery.

BRIEF DESCRIPTION OF THE DRAWINGS

The embodiments are illustrated by way of example, and not by way of limitation, in the figures of the accompanying drawings and in which like reference numerals refer to similar elements and in which.

SUMMARY

One embodiment is presented including an apparatus and system including an electronic flare having many light emitting diodes (LEDs), an arm connected to the electronic flare, a controller connected to the electronic flare, and a housing connected to the arm.

Another embodiment presented includes an electronic flare. The electronic flare includes a flare housing with many light emitting diodes (LEDs), a rotatable arm and controller are connected to the flare housing, and a base is connected to the arm. In this embodiment, the LEDs are multi-colored.

Yet another embodiment is presented that includes a system. The system includes a first electronic flare device that is disposed in a first portion of a vehicle, a second electronic flare device is disposed in a second portion of the vehicle, a first sensor is connected to the first electronic flare device and a second sensor is connected to the second electronic flare device. The first and second flare devices each have a flare housing including a plurality of light emitting diodes (LEDs). The first electronic flare device operates to deploy when the first sensor detects a first event, and the second electronic flare device operates to deploy when the second sensor detects a second event.

DETAILED DESCRIPTION

The Embodiments discussed herein generally relate to an electronic flare system and apparatus. Referring to the figures, exemplary embodiments will now be described. The exemplary embodiments are provided to illustrate the embodiments and should not be construed as limiting the scope of the embodiments.

Figure 1:
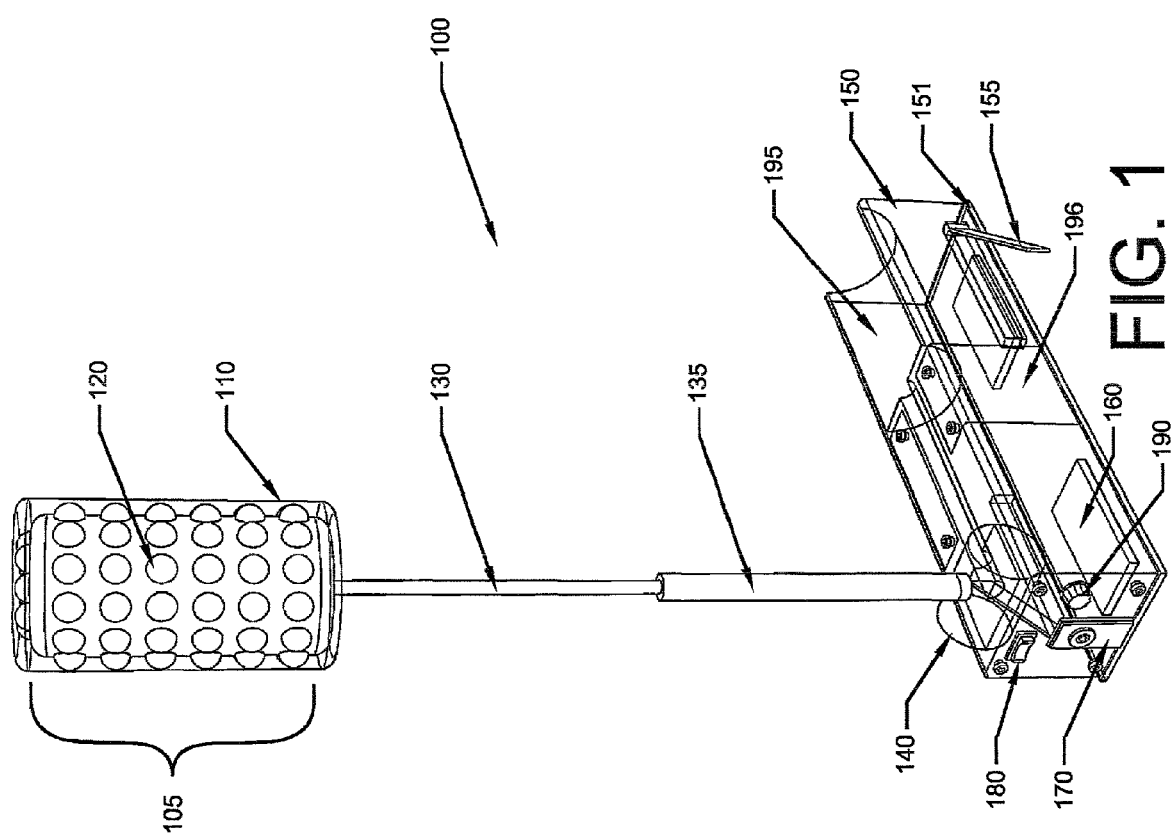
FIG. 1 illustrates one embodiment of a deployed electronic flare.

FIG. 1 illustrates one embodiment of an electronic flare. In this embodiment, electronic flare 100 includes protective lens 110, multiple light emitting diodes (LEDs) 120, an extension arm 130, rotating connector 140, base 150, magnet 160, adapter socket 170, on/off switch 180, controller 190, groove 195 and rechargeable battery 196.

In one embodiment, extension arm 130 is telescopic from base arm 135. Base arm 135 and extension arm 130 have a length that ranges from six inches to three or more feet, depending on the embodiment and intended use for electronic flare 100. In one embodiment, extension are 130 and base arm 135 are made of hardened metal or metal alloy, hardened plastic, carbon fiber, etc. In yet another embodiment, electronic flare 100 does not include extension arm 130.

Figure 4:
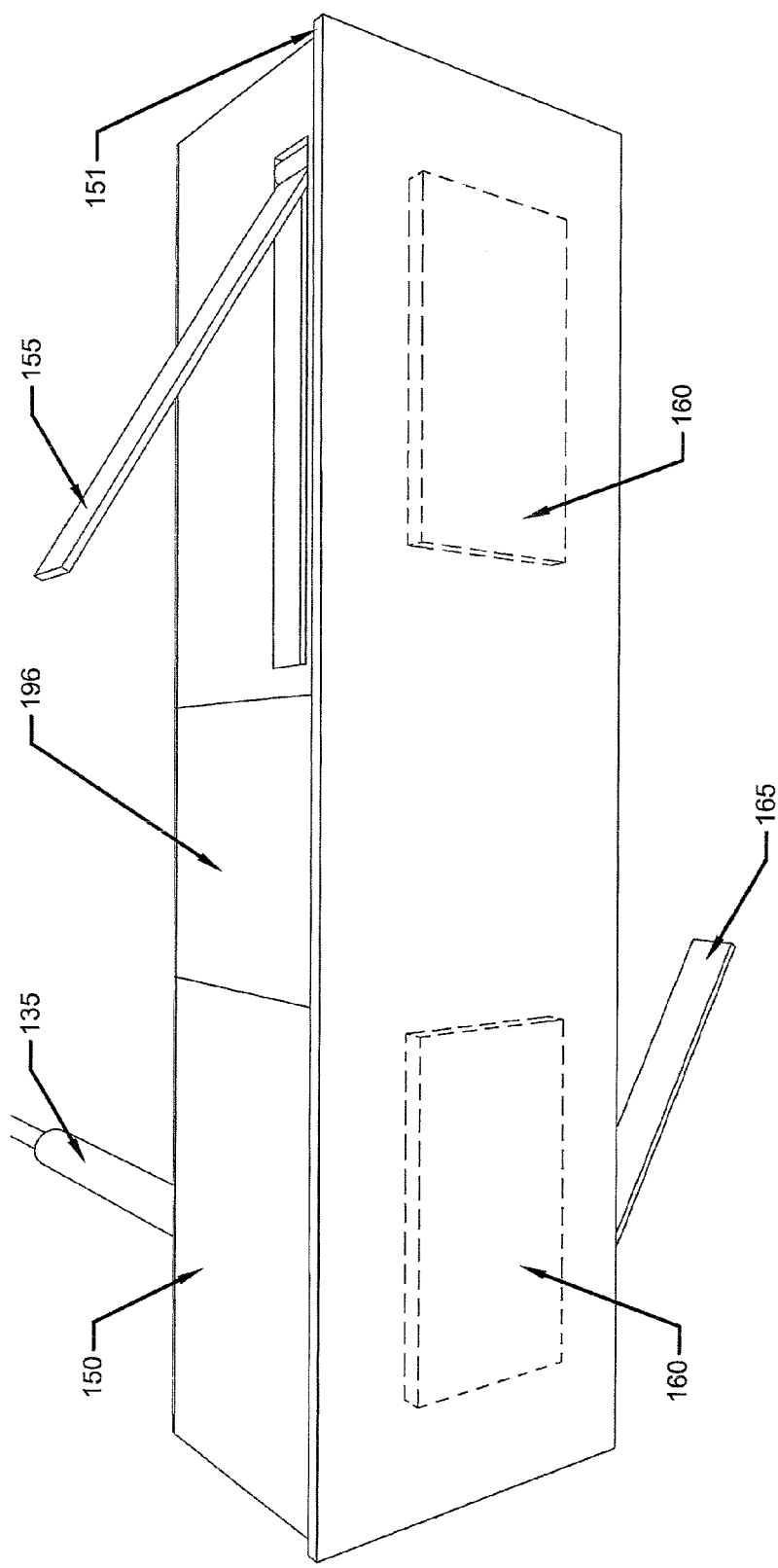
FIG. 4 illustrates a bottom view of an embodiment of an electronic flare.

In one embodiment, electronic flare 100 includes extendible stabilizers 155 and 165 (see FIG. 4). The extendible stabilizers 155 and 165 are used when electronic flare is placed on an uneven surface (such as the road, a non-metallic surface, damaged vehicle, etc.) to support base 150 and to prevent electronic flare 100 from tipping over.

For powering electronic flare 100, in one embodiment, 12 volt rechargeable battery 196 is housed in base 150. Rechargeable battery 150 is charged by connecting an adapter to adapter socket 170 from a charging source, such as a cigarette lighter socket cord in an automobile, an AC/DC adapter, etc. In another embodiment, regular batteries are used to power electronic flare 100. In one embodiment, an electronic circuit is used to monitor power consumption and remaining battery life in order to maximize and lengthen the time that electronic flare 100 remains operating. This feature is useful when electronic flare 100 is deployed for a long period of time.

In one embodiment, controller 190 is used to modify the pattern of LEDs 120. Controller 190 can set the pattern to blink, strobe, remain solid, light only certain colored LEDs, etc. It should be noted that LEDs 120 can be various sizes and colors, depending upon the intended use of electronic flare 100. For example, police may use an electronic flare 100 having infrared, purple, blue, red and yellow LEDs 120; individuals may have infrared, purple, yellow, clear and green LEDs 100, etc. In one embodiment, LEDs 120 surround flare housing 105, including the top of flare housing 105. It should be noted that the number of LEDs 120 is selected based on the size of electronic flare 100 and the specific size selected for LEDs 120.

In one embodiment electronic flare 100 includes a rubber bottom portion 151 attached to the bottom of base 150. In one embodiment, one or more magnets 160 are connected to base 150. The type of magnet 160 that is selected is strong enough to keep electronic flare 100 from moving when attached to a metal object, such as a vehicle. In one embodiment, exotic magnets are used to provide additional force to prevent electronic flare 100 from moving when used in a high wind situation. In one embodiment 150 is made of hardened plastic or other weather resistant hardened material. In one embodiment, electronic flare 100 has base 150 sealed, for example with rubber seals, to prevent water or moisture from entering base 150.

In one embodiment protective lens 110 is clear and made of shatterproof plastic. In another embodiment, protective lens 110 is prismatic. In another embodiment protective lens 110 magnifies the light produced by LEDs 120.

Figure 2:
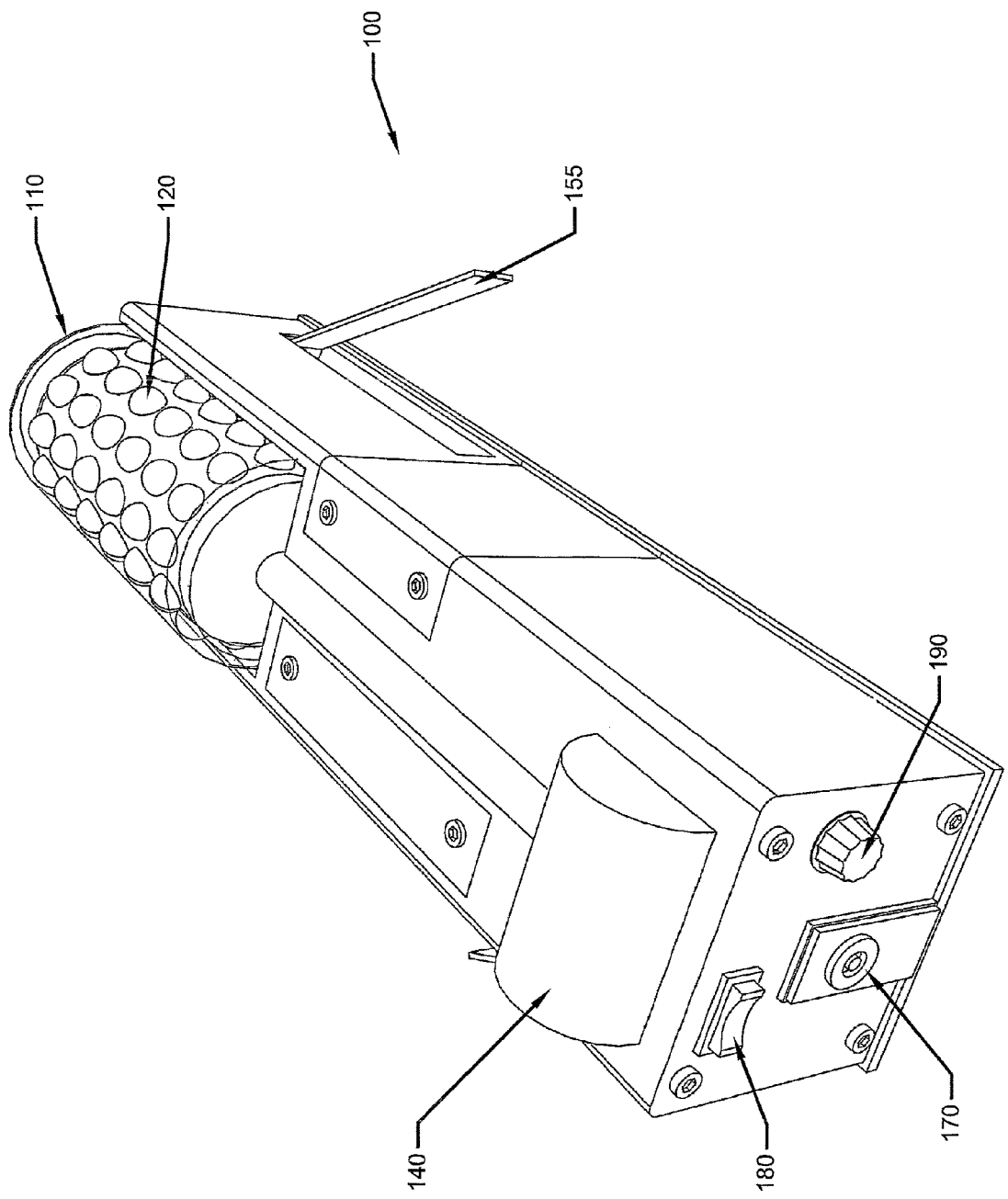
FIG. 2 illustrates an embodiment of an electronic flare in an non-deployed state.
Figure 3:
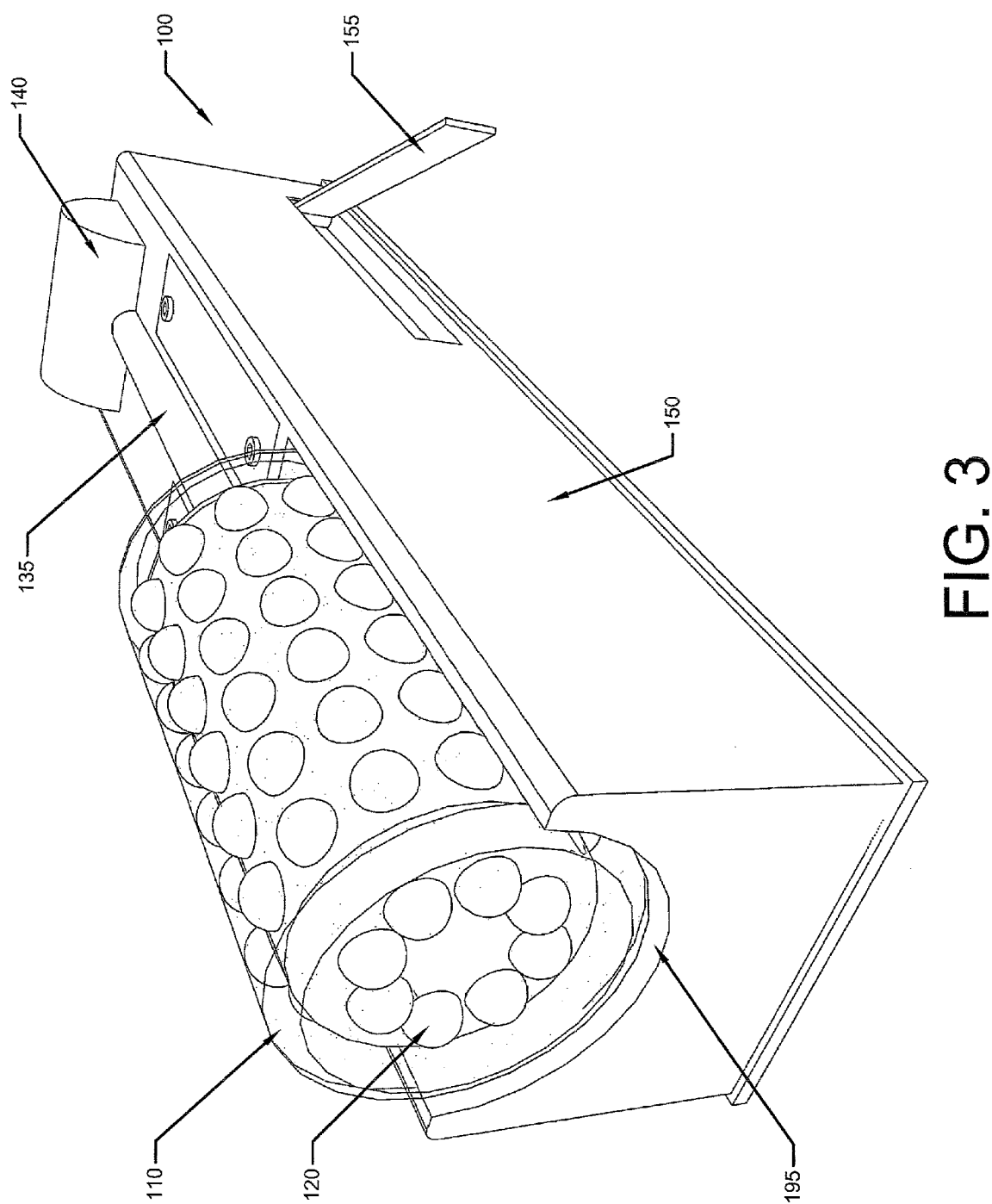
FIG. 3 illustrates another view of an embodiment of an electronic flare in an non-deployed state.

FIG. 2 illustrates electronic flare 100 in a non-deployed state. As shown, flare housing 105 is placed in groove 195. In this embodiment, flare housing 105 has a same extruding height (from base 150) as rotating connector 140. In another embodiment, in the non-deployed state, electronic flare has flare housing and rotating connector flush with the top of base 150. FIG. 3 illustrates another view of electronic flare 100 placed in a non-deployed state. It should be noted that electronic flare 100 can operate to emit light from LEDs 120 whether in a deployed state or in a non-deployed state.

FIG. 4 illustrates a bottom view of electronic flare 100. As shown, in this embodiment magnets 160 are internal to base 150 and are behind rubber bottom portion 151. It should be noted that rubber bottom portion 151 prevents scratching of surfaces (e.g., a vehicles roof, hood, etc.). It should also be noted that rubber bottom portion 151 provides a non-slip surface so electronic flare 100 does not slip or slide from its deployed surface. In one embodiment, rubber bottom portion 151 acts as a waterproof seal to base 150.

Figure 5:
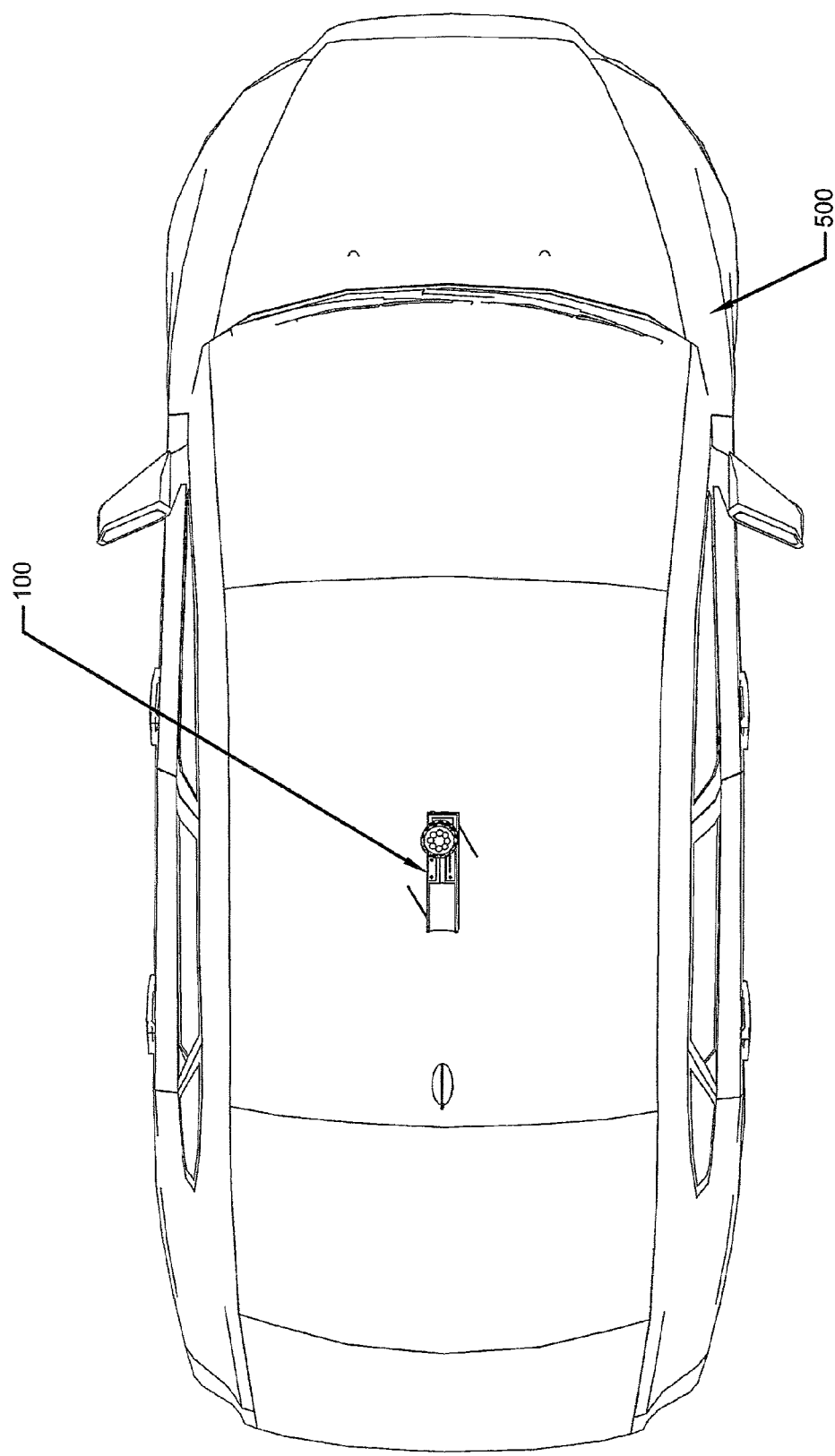
FIG. 5 illustrates an embodiment of a deployed electronic flare that is placed on a vehicle.

FIG. 5 illustrates electronic flare 100 deployed on top of a vehicle 500. As illustrated, electronic flare 100 is deployed without needing to be connected to a remote power source. In one embodiment, electronic flare 100 can be deployed using a remote power source through a power connector connected to adapter socket 170. As the LEDs 120 do not use much power, electronic flare 100 does not put a large drain on a vehicles battery when connected to power source from the vehicle (e.g., a cigarette lighter socket).

Figure 6:
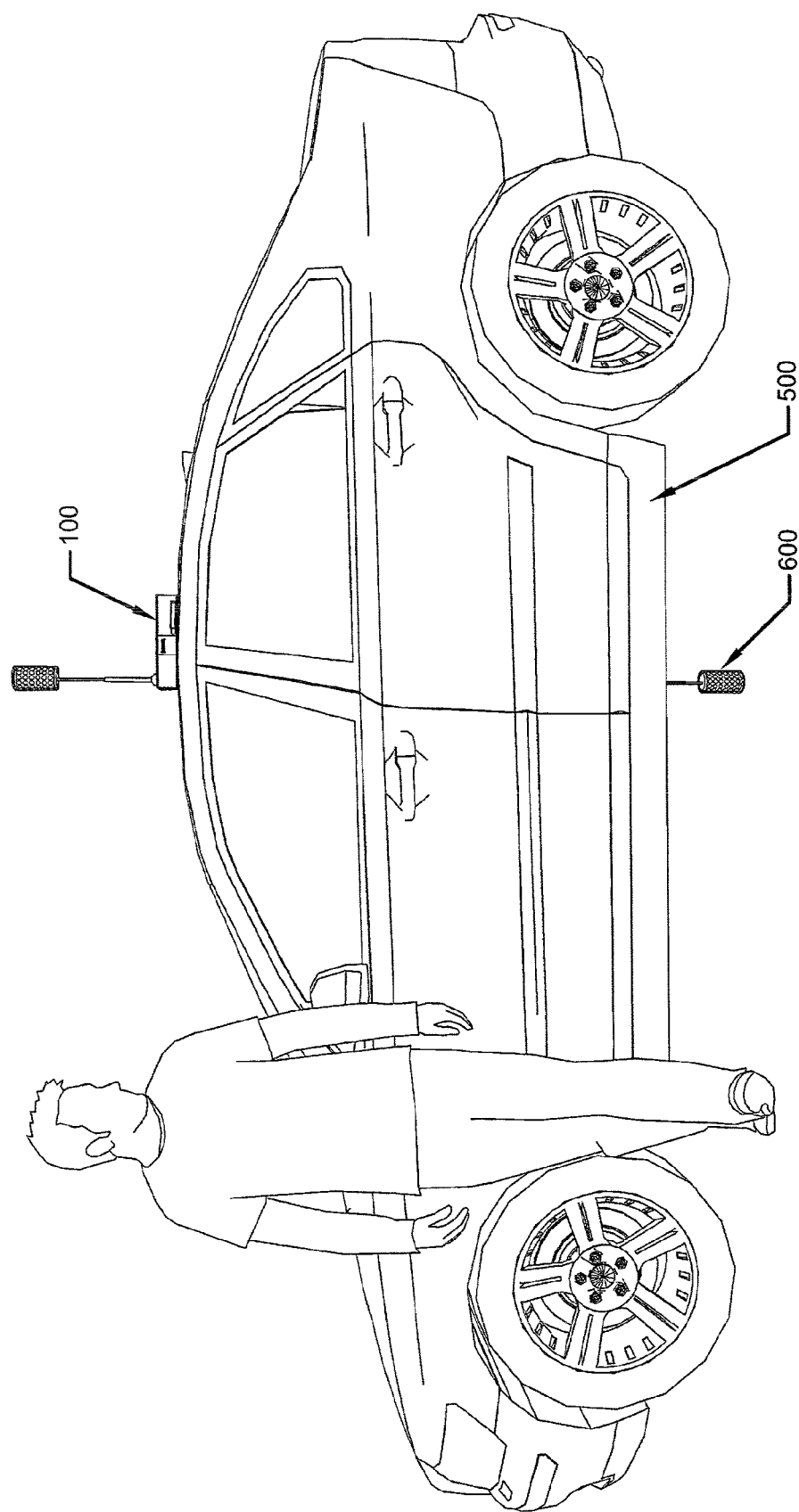
FIG. 6 illustrates another view of an embodiment of a deployed electronic flare that is placed on a vehicle

FIG. 6 illustrates electronic flares 100 and 600 deployed on vehicle 500. As shown, electronic flare 100 is mounted to the top of the vehicle's roof and electronic flare 600 is mounted to the undercarriage of vehicle 500. Electronic flares 100 and 600 are safer than standard ignited flares in that they do not cause gasoline to combust. When a vehicles battery dies and a vehicle is on the side of a road or in the middle of a road, electronic flare 100 and electronic flare 600 illuminates so that other passersby will be warned in advance. Also, when vehicles are involved in accidents, electronic flare 100 assists other motorists in noticing the vehicle involved. In some accidents, a vehicle may become overturned. In this case, electronic flares 100 and 600 can be placed so that other motorists, passersby, emergency vehicles, etc. can see and/or locate the vehicle involved in the accident.

Figure 7:
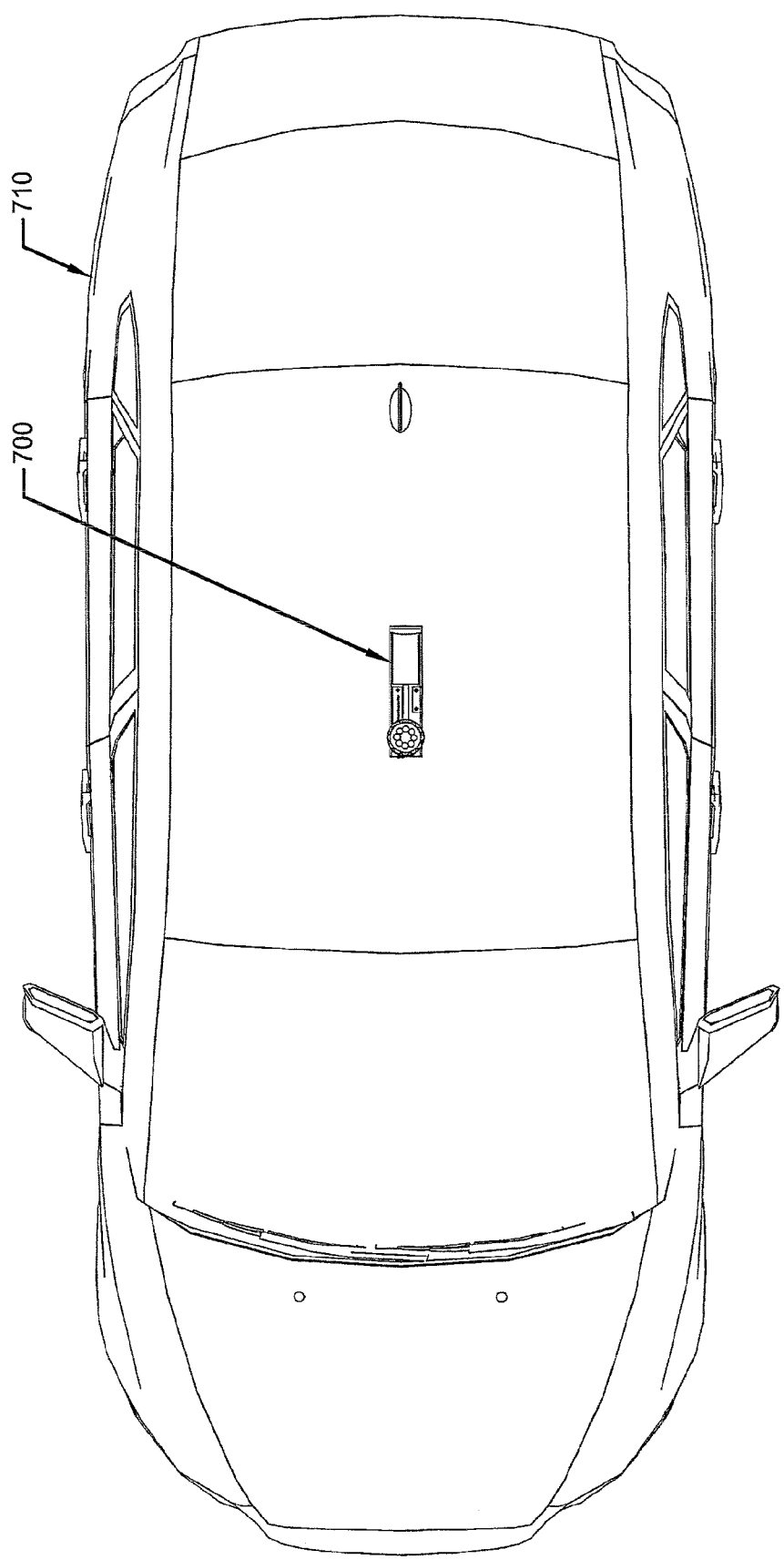
FIG. 7 illustrates an embodiment of a deployed electronic flare that is permanently fixed to a vehicle.

FIG. 7 illustrates an embodiment where electronic flare 700 is permanently attached (i.e., built in to the vehicle during manufacture, added as an option from a dealer or service technician, etc.) to a vehicle. In this embodiment, vehicle 710 is manufactured and sold with electronic flare 700 installed. In this embodiment, electronic flare 700 can be deployed automatically or manually. In one embodiment, electronic flare 700 is automatically employed when vehicle 710 is involved in an accident. In this embodiment, electronic flare 700 is deployed based on a sensor sensing an accident that relays a signal to electronic flare 700 for deployment. In one embodiment, the sensor is shock based. In another embodiment, the signal is sent to electronic flare 700 upon sensing deployment of protective air bags. In another embodiment, electronic flare 700 is deployed by use of a spring or pneumatic force. In one embodiment, electronic flare 700 includes a cover (not shown) that slides back or rotates onto vehicle 710 to allow deployment of electronic flare 700. In yet another embodiment, electronic flare 700 is vertically deployed instead of rotating as with electronic flare 100.

Figure 8:
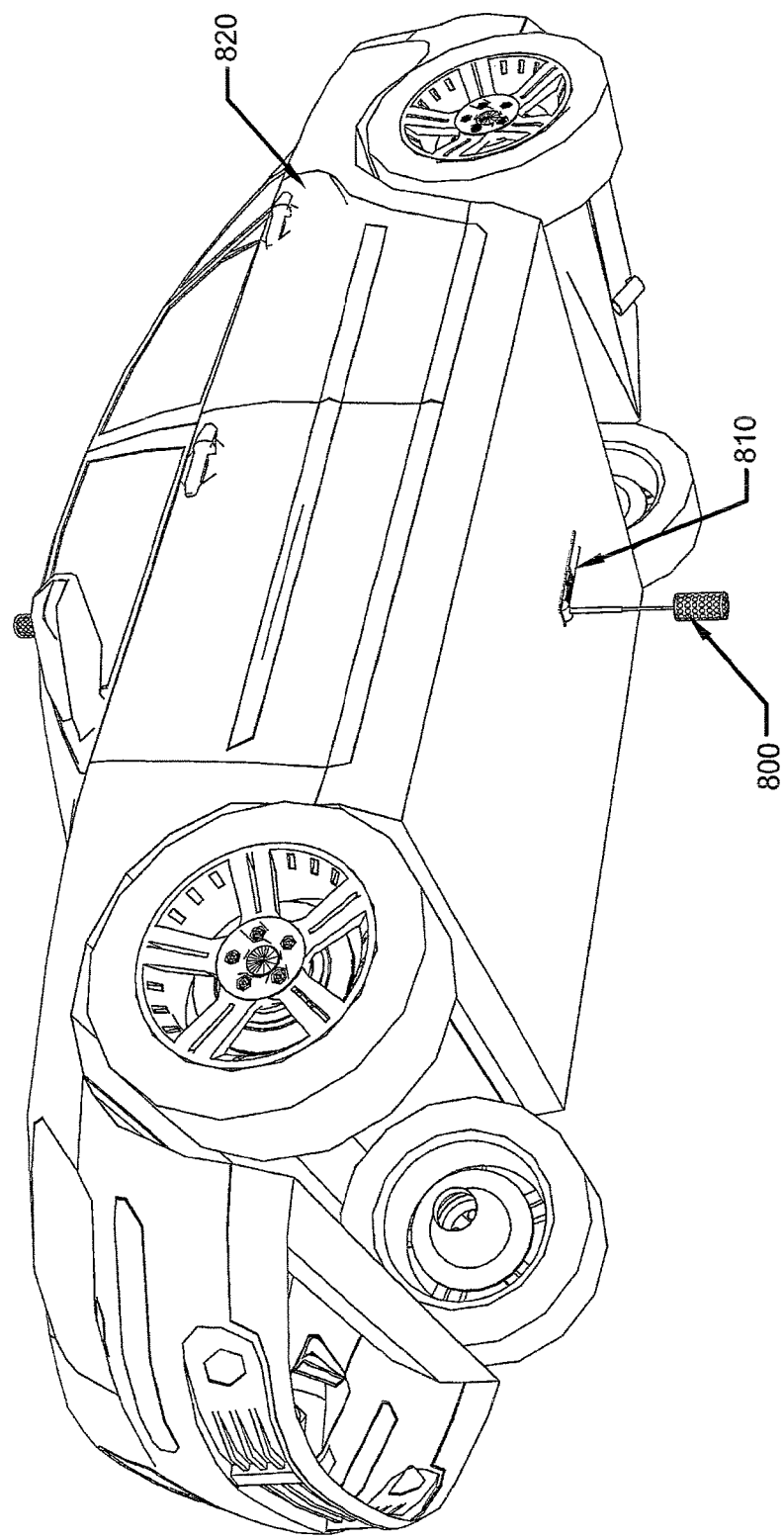
FIG. 8 illustrates a bottom view of an embodiment of a deployed electronic flare as part of a vehicle.

FIG. 8 illustrates an electronic flare 800 that is permanently attached to vehicle 820. As shown, electronic flare 800 is in a deployed state. In this embodiment, electronic flare 800 deploys from compartment 810. As with electronic flare 700, electronic flare 800 can be deployed manually by a user (e.g., from a switch) or automatically based on a sensor. In one embodiment, electronic flare 800 receives a signal for deployment when vehicle 820 is sensed to be in a state where electronic flare 800 can be seen easily. In this embodiment, a tilt switch or gravity switch can be used to trigger a signal to electronic flare 800. In other embodiments, other known sensors can be used to sense vehicle 820 is not in an upright position in order to send a signal to electronic flare 800. In yet another embodiment, electronic flare 800 (and 700) have a built in sensor to sense shock and position in order to be deployed. In one embodiment, electronic flare 800 is built into a vehicle as part of the existing lights (e.g., tail lights, turn signals, side lights, etc.).

Figure 9:
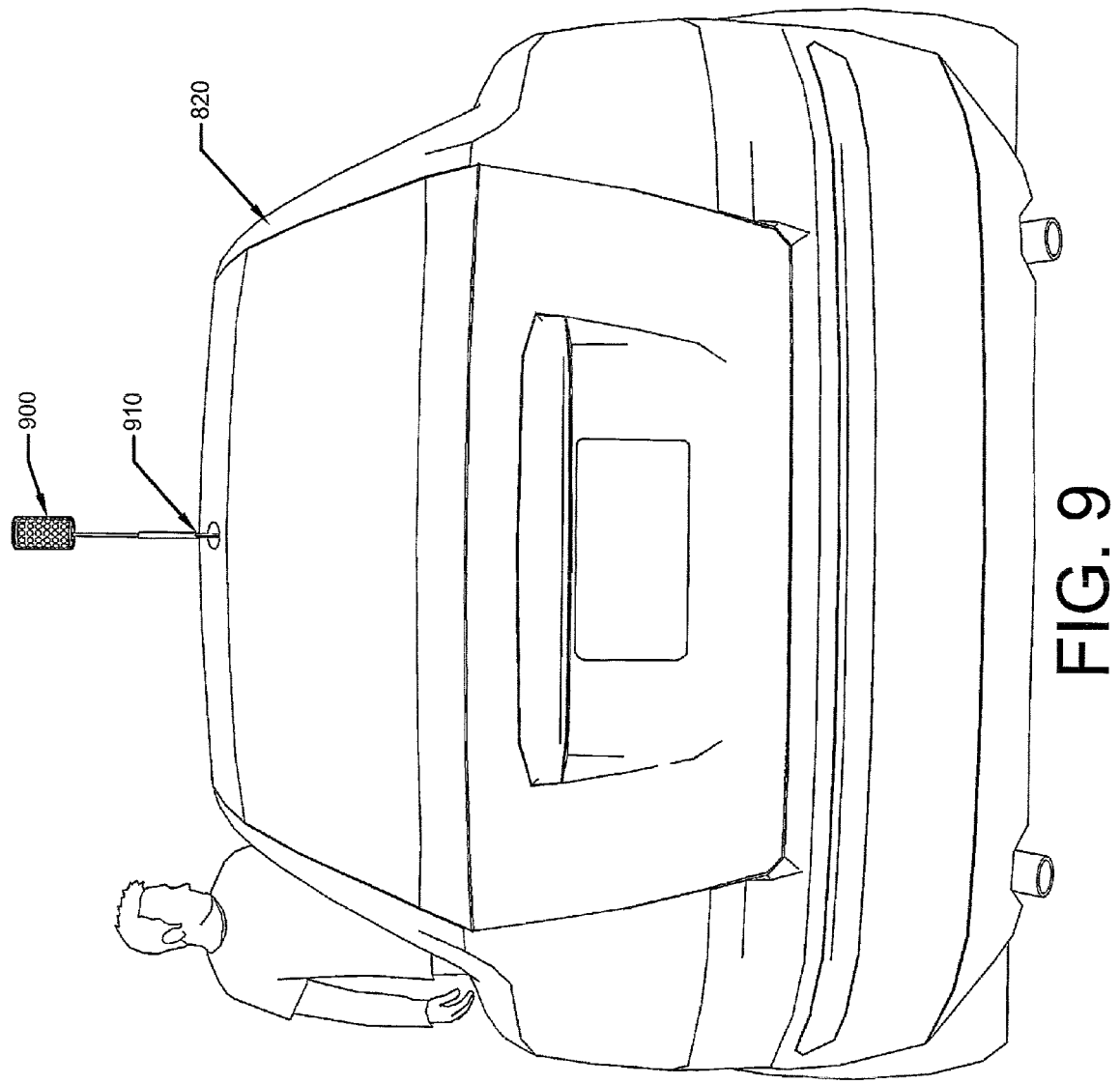
FIG. 9 illustrates a rear view of a vehicle including a deployed embodiment of an electronic flare as part of the vehicle.
Figure 10:
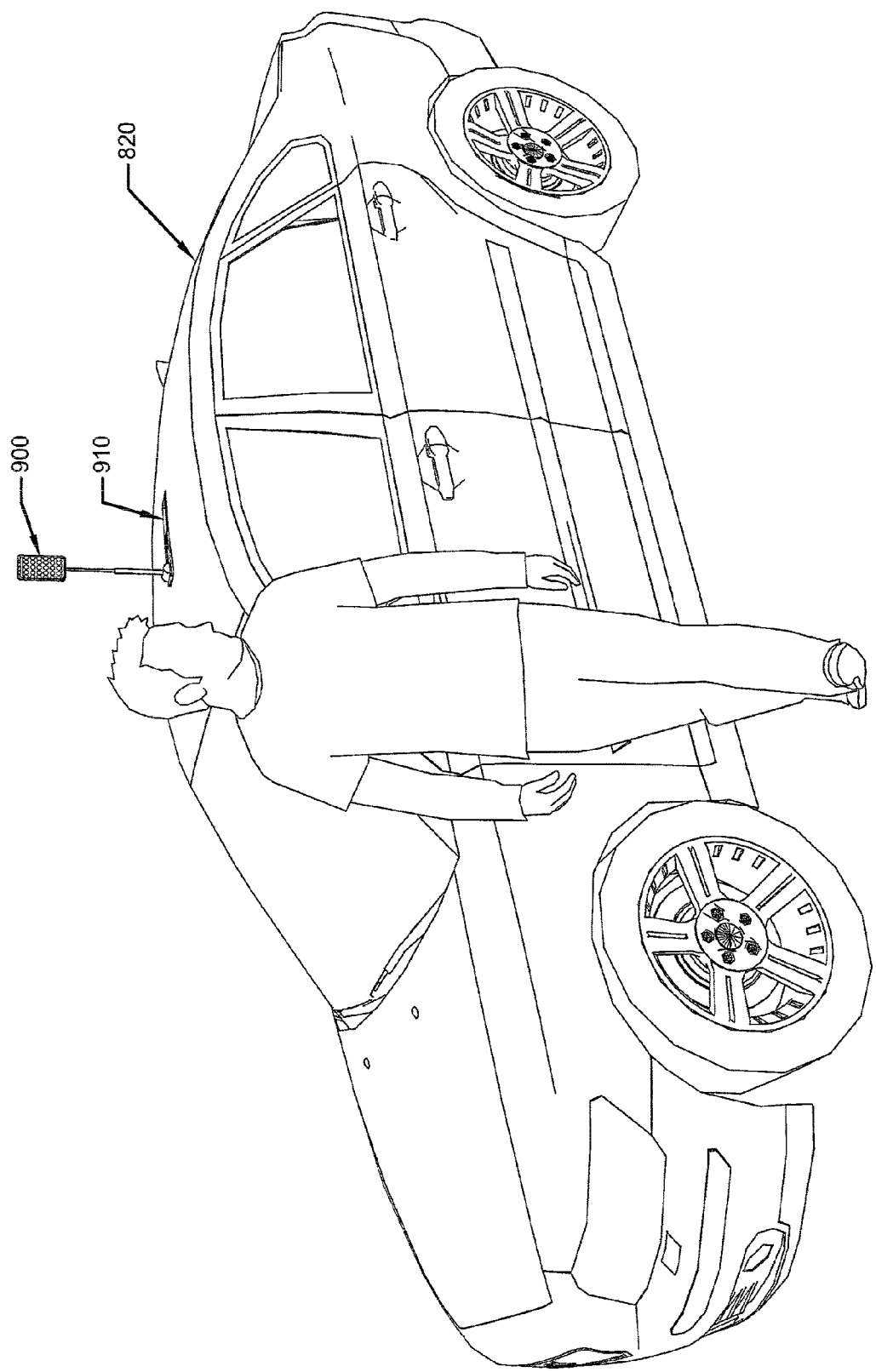
FIG. 10 illustrates a perspective view of a vehicle including a deployed embodiment of an electronic flare as part of the vehicle.

FIG. 9 illustrates a rear view of a vehicle 820 including an embodiment of electronic flare 900 shown in a deployed state. In this embodiment, electronic flare 900 deploys from opening 910, which is made as part of vehicle 820. In one embodiment, electronic flare 820 deploys vertically from opening 910. In another embodiment, electronic flare 820 rotates 90 degrees and then telescopes upward from vehicle 820. FIG. 10 illustrates a perspective view of vehicle 820 showing an embodiment of an electronic flare 900 in a deployed state. As shown, electronic flare 900 deploys from opening 910.

Electronic flare embodiments of the invention can thus be portable or permanently attached to a vehicle (e.g., trucks, heavy equipment, automobiles, motorcycles, boats, personal watercraft, quads, etc.).

In one embodiment when electronic flare devices are disposed in different portions of a vehicle, each flare device can deploy on sensing different events or the same events. The events are caused by different conditions. For example, if a vehicle rolls, a first event can be the rolling of the vehicle, which causes a first event (i.e., an accident), and a second event can be the condition of the vehicle (i.e., upside down).

In one embodiment, the electronic flare devices are not deployed immediately when sensing an event. In this embodiment, the electronic flare devices have delayed deployment until the vehicle comes to rest. This embodiment uses a motion sensor to determine when the vehicle comes to rest. In this embodiment, if the electronic flare devices are deployed too early in an accident, the electronic flare devices may become damaged.

Further embodiments include strengthened and hardened encasings for the electronic flare devices so that the electronic flare devices are deployable even in extremely bad accidents. In other embodiments, multiple redundant electronic flare devices are disposed in different portions of a vehicle in case one or more of the electronic flare devices become inoperable due to an accident.

In one embodiment, a sound chip is included in the electronic flare devices. In this embodiment, the electronic flare device periodically emits a sound to assist in finding an accident victim. In another embodiment, the electronic flare device is fitted with a fixing means, such as a strap, holding device, attachment device, etc. so that the electronic flare device is stowed in a set and safe place inside a vehicle to prevent the electronic flare device from becoming a projectile when a vehicle is involved in an accident. In one embodiment, based on a sensor detecting that a vehicle is in an accident, the electronic flare device begins to chirp and at least a portion of the lights are powered on (which can blink, be steady, etc.). This assists in the electronic flare from being easily found during, especially when a person may be dazed and confused from being in an accident or in hard to see situations (e.g., darkness, fog, smoke, haze, etc.).

In yet another embodiment, the electronic flare device includes a wireless telephone or radio device connected to a global positioning system (GPS) that automatically sends coordinates of a vehicle in an accident to an emergency channel or number (e.g., 911). In this embodiment, an automatic message is repeatedly sent multiple times. The message may include details of the accident, such as vehicle roll over, collision, air bags deployed, etc., along with the position of the vehicle (longitude, latitude, altitude) or converted position to street location. In yet another embodiment, the electronic flare device supports wireless functionality, such as blue tooth, Radio Frequency (RF), etc.

In another embodiment, besides contacting an emergency number or channel, the electronic flare device may contact a predetermined telephone number. In this embodiment, the predetermined telephone number is selected by a user. In this embodiment, once the telephone number is contacted, the receiver can contact emergency personnel and forward the details of the incident.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
    an electronic flare including a cylindrically shaped light portion, the light portion having a perimeter surrounded by a plurality of light emitting diodes (LEDs) and an outer lens, wherein a top portion of the cylindrically shaped light portion including a plurality of LEDs;
    a telescopic extension arm coupled to the electronic flare;
    a controller coupled to the electronic flare; and
    a housing comprising a plurality of extendible stabilizers disposed on opposite and separate sides of the housing, wherein the arm is coupled with the housing.

2. The apparatus of claim 1, wherein the arm is rotatable for raising and lowering the electronic flare.

3. The apparatus of claim 1, wherein the housing is permanently coupled to a vehicle and disposed within a body of the vehicle.

4. The apparatus of claim 1, wherein the housing is removably coupled to a vehicle for deployment on a ground surface for alerting oncoming traffic.

5. The apparatus of claim 1, wherein the housing including a concave groove portion that is shaped to store and hold the cylindrical light portion of the electronic flare in a non-deployed state.

6. The apparatus of claim 4, wherein the electronic flare is deployed manually by hand in an upright position relative to the housing.

7. The apparatus of claim 3, wherein the electronic flare is deployed automatically in an upright position, and the electronic flare is deployed by using a spring or a pneumatic force.

8. The apparatus of claim 7, wherein the electronic flare is automatically deployed based on signals received from an external sensor, wherein the signals are generated based on vehicle airbag deployment.

9. The apparatus of claim 4, wherein the housing including at least one magnet to hold the housing in place when coupled to a vehicle.

10. The apparatus of claim 9, further comprising at least one rechargeable battery to power the electronic flare coupled to an adapter socket, wherein the housing is a handheld self contained portable device, and the socket removably couples to an external AC/DC adapter.

11. An electronic flare, comprising:
    a flare housing including a cylindrically shaped light portion having a perimeter surrounded by a plurality of light emitting diodes (LEDs) and an outer lens, wherein the flare housing includes a concave groove portion that is shaped to hold and store the cylindrically shaped light portion in a non-deployed state and a bottom surface coupled with a non-slip material, and wherein a top portion of the cylindrically shaped light portion including a plurality of LEDs;
    a rotatable telescopic arm coupled to the flare housing;
    a controller coupled to the flare housing, wherein the controller controls signals to the light portion and controls power consumption; and
    a base coupled to the arm,
wherein the LEDs are multi-colored.

12. The electronic flare of claim 11, wherein the flare housing is coupled to a plurality of extendible stabilizers disposed on opposite and separate sides of the flare housing.

13. The electronic flare of claim 11, wherein the electronic flare is permanently disposed within a body of a vehicle and is deployed from a compartment within an outer body of the vehicle.

14. The electronic flare of claim 11, wherein the electronic flare is a handheld portable device.

15. The electronic flare of claim 11, wherein the flare housing and the arm fit into separate and respectively shaped groove portions in the base in a non-deployed state.

16. The electronic flare of claim 11, wherein the electronic flare is deployed manually by hand in an upright position relative to the base.

17. A system, comprising:
a first electronic flare device disposed in a top portion of a vehicle roof;
a second electronic flare device disposed in a bottom portion underneath the vehicle;
the first and second flare devices each having a flare housing including a cylindrical light portion having a perimeter surrounded by a plurality of light emitting diodes (LEDs) and an outer lens, wherein the first electronic flare device and the second electronic flare device are integrated with the vehicle's existing light system, and wherein a top portion of the cylindrically shaped light portion including a plurality of LEDs,
wherein the first electronic flare device operates to deploy when a first external sensor detects a first event and provides a first signal to the first electronic flare device, and the second electronic flare device operates to deploy when a second external sensor detects a second event and provides a second signal to the second electronic flare device, wherein the first event and the second event are different and distinct events, and the second electronic flare device is deployed when the vehicle is not in an upright position.

18. The system of claim 17, wherein the first event and the second event are related to separate emergency conditions.

19. The system of claim 18, wherein a vehicle accident causes deployment of one of the first electronic flare device, the second electronic flare device, and the first and second electronic flare devices.

20. The system of claim 17, wherein the first and second electronic flare devices each include a separate controller each having a processor that operates to monitor power use and control a plurality of different lighting sequences of light emitted from the plurality of LEDs upon the first and second electronic flare device's being operated via battery power.

* * * * *